US007944847B2

(12) United States Patent
Trine et al.

(10) Patent No.: US 7,944,847 B2
(45) Date of Patent: May 17, 2011

(54) VOTING COMPARATOR METHOD, APPARATUS, AND SYSTEM USING A LIMITED NUMBER OF DIGITAL SIGNAL PROCESSOR MODULES TO PROCESS A LARGER NUMBER OF ANALOG AUDIO STREAMS WITHOUT AFFECTING THE QUALITY OF THE VOTED AUDIO STREAM

(75) Inventors: Linda M. Trine, Keller, TX (US); John Livdahl, Waseca, MN (US)

(73) Assignee: EFJ, Inc., Irving, TX (US)

( * ) Notice: Subject to any disclaimer, the term of this patent is extended or adjusted under 35 U.S.C. 154(b) by 279 days.

(21) Appl. No.: 11/768,011

(22) Filed: Jun. 25, 2007

(65) Prior Publication Data

US 2008/0317066 A1 Dec. 25, 2008

(51) Int. Cl.
*H04L 12/28* (2006.01)

(52) U.S. Cl. ......... 370/252; 370/349; 370/389; 370/465

(58) Field of Classification Search ........................ None
See application file for complete search history.

(56) References Cited

U.S. PATENT DOCUMENTS

| | | | | |
|---|---|---|---|---|
| 4,013,962 | A | 3/1977 | Besek et al. | |
| 4,630,262 | A | 12/1986 | Callens et al. | |
| 5,220,565 | A | 6/1993 | Wilson et al. | |
| 5,719,871 | A | 2/1998 | Helm et al. | |
| 5,923,454 | A | 7/1999 | Eastmond et al. | |
| 5,978,762 | A | 11/1999 | Smyth et al. | |
| 6,173,431 | B1 | 1/2001 | Rittle | |
| 6,219,389 | B1 | 4/2001 | Pappas et al. | |
| 6,321,086 | B1 | 11/2001 | Thursdon et al. | |
| 6,345,253 | B1 * | 2/2002 | Viswanathan | 704/272 |
| 6,658,027 | B1 * | 12/2003 | Kramer et al. | 370/516 |
| 6,704,308 | B2 * | 3/2004 | Sanders et al. | 370/376 |
| 6,847,827 | B2 | 1/2005 | Helm et al. | |
| 6,885,989 | B2 | 4/2005 | McLean et al. | |
| 2002/0172221 | A1 * | 11/2002 | Dale et al. | 370/466 |
| 2003/0098682 | A1 * | 5/2003 | Jin et al. | 324/76.21 |
| 2005/0254663 | A1 | 11/2005 | Raptopoulos et al. | |
| 2006/0262771 | A1 | 11/2006 | Martinez et al. | |
| 2007/0091855 | A1 * | 4/2007 | Karaoguz et al. | 370/338 |
| 2008/0022340 | A1 * | 1/2008 | Hannuksela et al. | 725/112 |
| 2008/0310398 | A1 * | 12/2008 | Jain et al. | 370/352 |

* cited by examiner

*Primary Examiner* — Chi H. Pham
*Assistant Examiner* — Shick Hom
(74) *Attorney, Agent, or Firm* — McKee, Voorhees & Sease, P.L.C.

(57) ABSTRACT

A method and apparatus for selecting a preferred signal from homogenous streams of a subscriber call in an analog or mixed mode wireless communication network. The method and apparatus have particular significance to un-decoded analog radio packets which require digital signal processing to decode at least their signaling information. The method allocates at least one stream with the best signal qualities to real-time full-decoding in a DSP, and allocates lower quality streams to non-real time burst decoding in the same or another DSP. As signaling quality changes in the homogenous streams, the full-decoding can be re-allocated to a now higher quality stream. Burst decoding lower quality streams allows for more efficient use of DSP processing power and allows more streams to be processed without significant affect on audio content or quality.

59 Claims, 7 Drawing Sheets

VOTING COMPARATOR METHOD, APPARATUS, AND SYSTEM USING A LIMITED NUMBER OF DIGITAL SIGNAL PROCESSOR MODULES TO PROCESS A LARGER NUMBER OF ANALOG AUDIO STREAMS WITHOUT AFFECTING THE QUALITY OF THE VOTED AUDIO STREAM

I. BACKGROUND OF THE INVENTION

A. Field of Invention

The present invention relates generally to diversity combining or voting to distinguish the most useable or preferred signal from a number of homogenous streams of transmitted audio content received at multiple receiving antennas from a subscriber radio or device of a wireless communication system, and, in particular, in conventional analog streams the ability to process signaling characteristics used for voting from a greater number of streams requiring digital signal processing than the number of available digital signal processors ("DSPs"), while maintaining audio quality of the voted stream.

B. Problems in the Art

Many wireless communication systems are comprised of a plurality of mobile (vehicle-mounted) or portable (handheld) transceivers and a plurality of receivers positioned over an intended space of use. Due to power and size considerations inherent to them, these mobile or portable devices have a relatively small effective broadcast range when compared to stationary antennas of the receivers.

1. LMR and Space Diversity

One example is land-mobile radio ("LMR"). For LMR mobile or portable radios (subscriber units or subscribers) which communicate with a base station over a single frequency, area coverage (space diversity) in size and quality can be increased through the use of the multiple, geographically distributed receivers. These receivers are often located remote from the base station to extend quality coverage of the receiver end of a repeater system. Because the mobile or portable radio transmission can be received by multiple receivers simultaneously, diversity combining or voting is a well-known and widely used method to evaluate and select from these multiple signals to present a high quality, continuous version of the mobile radio transmission content for re-transmission to another mobile or portable subscriber radio or listening at, for example, a base station or dispatch console.

Even though the audio streams in the signals from the multiple receivers should have the same audio content (e.g. the same voice message), quality of the signal may vary significantly. Thus, signal quality is a conventional consideration when selecting or voting the "best" or preferred signal. For good reproduction of the audio content of the original call, the stream with the most desired characteristic(s) is selected from the set of homogenous streams to ultimately relay to the intended recipient(s) of the transmission.

2. Conventional Diversity Combining or Voting Diversity combining or stream selection uses the voting comparator or voter to analyze one or more signal characteristics of the streams and to choose a preferred or "voted" stream. In order to compare signal characteristics, the signaling information must be processed from the transmission. There are a variety of signals which are transmitted by mobile or portable radios, each of which has different processing requirements.

In the case of what is termed in the art as conventional analog (as opposed to purely digital), DSPs are used as an efficient way of processing the signaling information associated with each stream. One example is Continuous Tone-Coded Squelch System (CTCSS) selective calling. Therefore, many conventional analog systems rely on such digital signal processing in a DSP, even though the audio content is analog, e.g., analog frequency modulation (FM) or phase modulation (PM). Some conventional analog systems superimpose digital data on the analog content. DSP processing is also an efficient method of handling these signals. An example is Digital-Coded Squelch (DCS or sometimes called CDCSS). Others exist.

One function of the voting comparator is to discriminate between different received versions of the subscriber call. As described above, with space diversity multiple receiver/antennas, a high quality continuous version of the audio content of the call may not always be available through a single path from the subscriber.

Thus, a variety of selection methods for two or more signals by a voter or voting comparator have been developed and are known in the art. Just a few general examples can be found at U.S. Pat. Nos. 4,013,962 and 5,719,871, 6,321,086, which are incorporated by reference herein. The voting comparator performs an evaluation of all received signals related to a subscriber call and picks the most useable or preferred received signal. The voted audio content goes to a repeater and/or a console speaker at the base station and the audio from all other signals is either muted or ignored. A voting comparator can either pick the "best" of the signals and use that signal for the remainder of the call, or can pick the "best" signal and then switch between receivers in tenths or hundredths-of-a-second (faster than a single syllable) if the originally selected signal ceases to be "best". Thus, voting is usually based on some characteristic of signal quality. In LMR, one commonly used criterion or voting metric is received signal strength indicator ("RSSI"). This can be sent with the audio stream from its receiver, sent separately but correlated to its audio stream, or measured and correlated with each stream at the receiver or voter.

Some communications systems, including some LMR systems, organize at least the signaling information related to each stream into digital data in what are referred to as containers, frames, or packets, each of which has control information (e.g. subscriber and receiver identities, priority, status so that each stream can be recognized and processed). Existing state of the art voters tend to rely on utilizing a single DSP for processing the data related to each of the streams the voter can receive. See simplified diagram of FIG. 1, showing one full decode DSP per audio stream to be voted. One advantage of this paradigm is that the full, decoded signaling content of each stream AS(1) to (N) is immediately available for selection at any time, and in essentially "real time". This allows quick selection of a single high quality signal from the multiple streams, without loss of content or time lag, even if the voter switches between streams. However, using dedicated DSP modules for every possible analog stream a voter could receive represents a significant cost to a radio system as well as a severe limit on the amount of streams a voter can process concurrently.

Another problem related to radio transmission is that signal quality is often difficult to distinguish. There exist in the art a plurality of metrics used to characterize signal quality and distinguish between signals based on the same; however these various metrics have specific areas of strength and weakness that limit their usefulness in determining true signal quality. The state of the art tends to rely on just one metric. For example, RSSI tends to be a good indicator of signal strength, but signal strength may not equate with audio quality. RSSI also has variability dependent upon a number of factors. Out-of-band noise (OOBN) is a good metric for low signal quality, but can give false noise indications for signals above a certain dB SINAD ("signal to noise and distortion"). Signal-to-Noise Ratio (SNR) can take significant time to establish. Also, if established at the receiver, SNR ignores noise between the receiver and the voter. Therefore, improvement in signal quality metrics, including use of multiple or combined signal quality metrics, could give a more accurate measure of signal quality related to audio quality.

Furthermore, it is a well recognized problem that radio systems are often incompatible with each other. This can be problematic and dangerous, especially in the case of first responders and emergency personnel. A radio system with voting that is compatible with a number of communication protocols could represent an improvement in the art.

Therefore, there is a need for voting system that improves processing efficiencies and is economical by utilizing fewer digital signal processors than conventional. A need has been identified for a more economical, non-complex, practical way of using a limited number of DSP modules to process a larger number of audio streams without affecting the quality of the voted audio stream.

II. SUMMARY OF THE INVENTION

A. Objects, Features, Advantages and Aspects of the Invention

A primary object, feature, advantage or aspect of the present invention is to provide a method, apparatus, or system for diversity combining or voting which improves over or solves problems and deficiencies in the state of the art.

Further objects, features, advantages or aspects of the invention include a method apparatus or system for diversity combining or voting which:

1. uses a limited number of decoding DSPs for a larger number of analog audio streams needing digital signal processing.

2. has the capability to decode signaling from more analog audio streams than state of the art systems.

3. can more effectively use the processing power of DSPs relative to diversity combining.

4. can reduce the component cost associated with voting comparators.

5. provides acceptable or improved audio quality.

6. can be adapted to support different communications protocols and systems, including support of analog, digital, and mixed mode communication.

7. can provide improved metrics for determining signal quality for voting.

8. can be implemented with other features or components.

9. is flexible and adaptable to a variety of different systems.

These and other objects, features, advantages, and aspects of the invention will become more apparent with reference to the accompanying specification and claims.

B. Summary of Aspects of the Invention

The inventors identified a need in the art to reduce the number of DSPs required to decode data related to a number of analog audio streams requiring immediate digital signal processing. This is especially applicable in determining the best signal from a set of homogenous un-decoded analog audio streams for processing a communication over a network. In one aspect of the invention this was accomplished as follows.

A voting comparator for processing multiple analog audio streams based on a transmitted communication includes first and second DSP processes. The voting comparator ranks all the incoming audio streams to process based on one or more voting parameters or metrics. The first DSP process is designated a full decode DSP process and at least data related to an audio stream selected as the preferred or voted stream, according to the voting parameter or metric, is directed to this first DSP process for full decoding in real time. The selected or voted stream is directed to an output for further use. Data related to non-selected streams are sent to the second DSP process, a batch or burst decoding DSP process. The batch or burst decoding DSP process does not decode in real-time. Instead it allows data related to those streams to accumulate until a preset amount is reached, and then processes the accumulated batch. The batch or burst decoding DSP also may batch decode only a limited part of signaling data related to each stream to save processing power and time. The voting comparator can process more incoming streams than the number of DSPs. The first and second DSP processes can be implemented in a single DSP, if it has sufficient processing power. Alternatively, the first (full decode) DSP process can be implemented in a dedicated DSP and the second (burst decode) DSP process implemented in a separate DSP. Alternatively, the first (full decode) process can be implemented for one or more streams in one or more DSPs and the second (burst decode) DSP process implemented for one or more streams in one or more DSPs. In this aspect of the invention, the total number of DSPs is less than the total number of streams handled, and can be substantially less than the total number of streams they can handle.

In another aspect of the invention, a top ranked or rated encoded analog audio stream in a voting comparator is the selected or "voted" stream and is dispatched to a first full-decode DSP, with the next highest ranked stream dispatched to a second full-decode DSP. The streams are concurrently fully decoded in real time. Any other incoming streams are dispatched to one or more batch or burst decoding DSPs for burst decoding of just signaling information in the streams. Upon re-evaluation of the streams during the duration of a call, it is possible that streams are re-ranked according to a voting parameter or metric. Streams previously full decoded in the second DSP or burst decoded in a burst decode DSP can take over as the voted stream in a full decode DSP, and be fully decoded. The voting comparator has signal quality information to rank all streams and has immediate, real time access to two fully decoded streams for selection of the best audio content for output, as well as relatively quick access to signal quality of the other streams for potential promotion, if any improves in rank over the currently selected stream.

In another aspect, the voting comparator can use a single voting parameter or metric, a plurality, or a combination of several. Such voting parameter(s) or metric(s) can include, but is/are not limited to, signal quality metrics such as out of band noise ("OOBN"), signal to noise ratio ("SNR"), and received signal strength indication ("RSSI"). These metrics can be obtained from measurements of each stream or are decoded from information associated with each stream and used by the voting comparator. In one aspect, one metric can be used if certain signal quality conditions are met, but another metric if differing signal quality conditions exist. An alternative aspect of the invention comprises an algorithm that combines certain of the metrics and gives a final composite metric for each stream. Rankings can be established and periodically re-evaluated. Optionally, the results of these rankings are stored as trends. The algorithm used to select the best stream can take into account whether a stream is on a positive or negative trend. In cases where signal quality is similar between multiple streams, the trend can be used as the metric, or as a part of a metric.

In another aspect of the invention, a wireless communication system includes a voting comparator which utilizes less DSPs than potential incoming audio streams needing digital signal processing. The communication system includes multiple subscriber mobile or portable communication units, at least one base station, and multiple receivers over a coverage range adapted to receive a call from a subscriber unit. Each receiver that receives the call sends signaling information and its corresponding audio stream to the voting comparator for ranking and selection of a voted stream. A DSP of the voting comparator fully decodes in real time some or all information of the selected stream. Selected information of other incoming streams are batch or burst decoded unless promoted to the voted stream in the DSP or in a separate DSP.

Aspects of the invention provide for efficient use of DSP processing power, as well as better identification of high quality signals. This allows for fewer DSPs to be used in a given voting comparator of a communication system and increases the voting comparator's ability to deliver high quality communication and handle more streams.

III. BRIEF DESCRIPTION OF THE DRAWINGS

FIG. 4 is a detailed diagrammatic view of one method of implementing the embodiment of either FIG. 2 or 3 in the context of packet-based communication, showing states that the method will transition between.

IV. DETAILED DESCRIPTION OF EXEMPLARY EMBODIMENTS OF THE INVENTION

A. Overview

Figure 1:
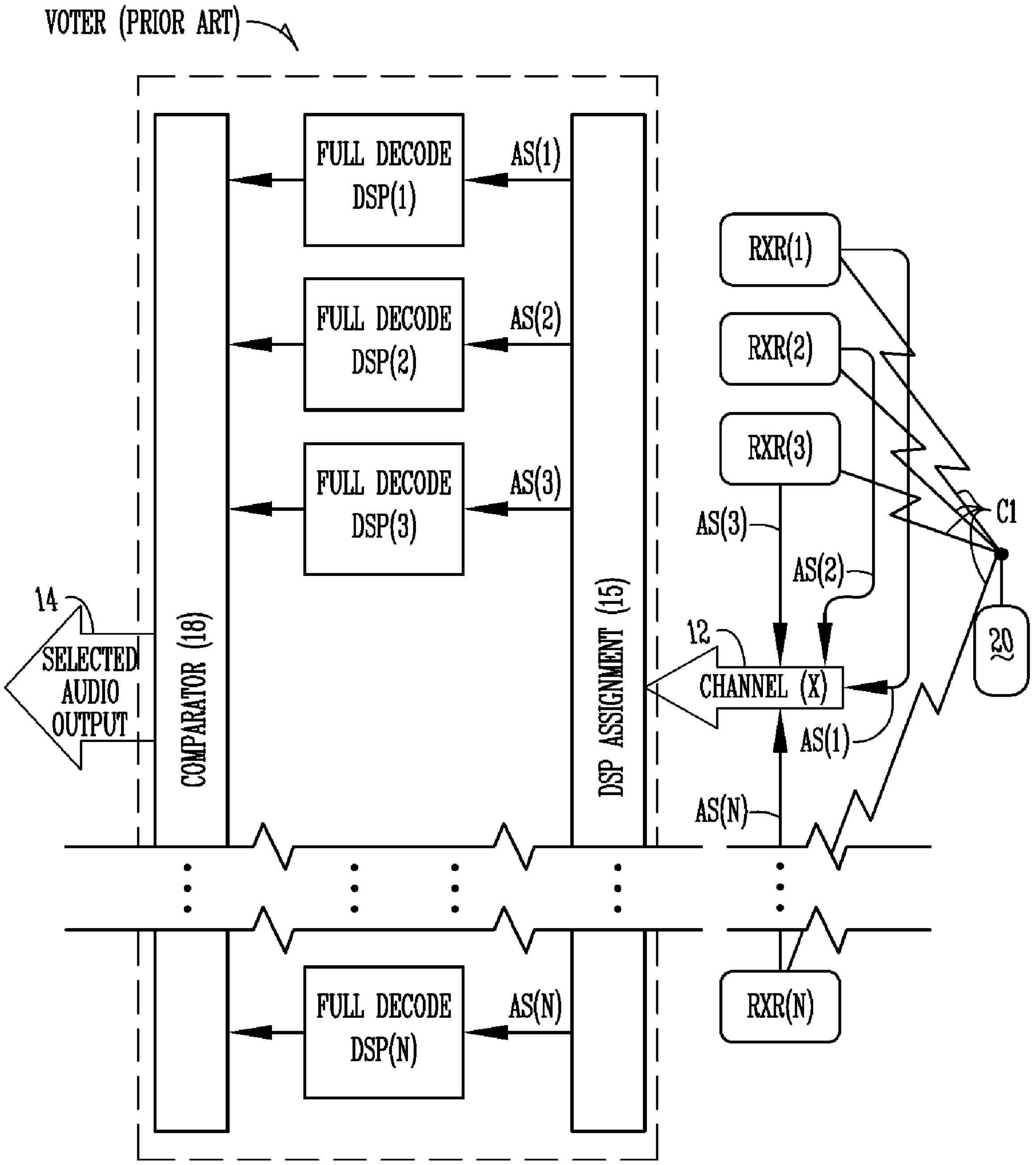
Fig.1 (PRIOR ART)
FIG. 1 is a simplified block diagram of a conventional prior art voting method, using a full decode DSP for each audio stream to be voted.

For a better understanding of the present invention, specific exemplary embodiments according to the present invention will be described in detail. These embodiments are by way of example and illustration only, and not by way of limitation. The invention is defined solely by the appended claims.

Frequent reference will be taken in this description to the drawings. Reference numerals and letters will be used to indicate certain parts or locations in the drawings. The same reference numerals or letters will be used to indicate the same parts and locations throughout the drawings, unless otherwise indicated.

The detailed examples will be in the context of an LMR system using an analog or mixed-mode analog voter. Each subscriber call or talk back may require DSP processing to process signaling information related to audio streams from a plurality of geographically distributed receivers. The receivers send their signaling information related to their received version of the call in multiplexed fashion on a single channel to the voter. The streams include at least one signal characteristic that is indicative of signal quality. Alternatively, a signal quality characteristic can be measured at the receiver or voter and associated with a stream.

One commercially available example of an LMR voting comparator is the IP25 Voter Comparator available from EF Johnson, Irving, Tex. USA. Others are available from a variety of sources.

As discussed in the Background of the Invention, FIG. 1 illustrates a prior art method of voting between multiple audio streams AS(1)-(N) from a subscriber call C1. A separate DSP (1)-(N) is assigned to each possible incoming stream AS(1)-(N). Each DSP is configured for full, real time decoding of at least the data in or related to a stream. By software and hardware, as are commercially available and well known in the art, the voter has a DSP assignment component 15 which splits out each stream AS(1), (2), (3), . . . , (N) to its corresponding assigned DSP (1), (2), (3), . . . , (N). Comparator component 18, using a voting parameter or metric, ranks each fully decoded stream and selects or votes a preferred stream for decoded output 14 based on, for example, RSSI of each stream. Conventional voters either vote a preferred stream and maintain that stream at output 14 during the duration of the call, or switch between streams during the call based on which stream is ranked higher according to the metric, e.g. RSSI, at each voting time.

These methods and components are conventional and known in the art. For example, U.S. Pat. Nos. 5,923,454 and 6,219,389 discuss aspects of voting parameters or metrics, and are incorporated by reference herein. Details about their operation will not be repeated further here. A comparison between the prior art system of FIG. 1 and exemplary embodiments of the present invention will now be set forth.

B. General Example

1. Voter for Multiple Receivers and Encoded Audio Streams

Figure 2:
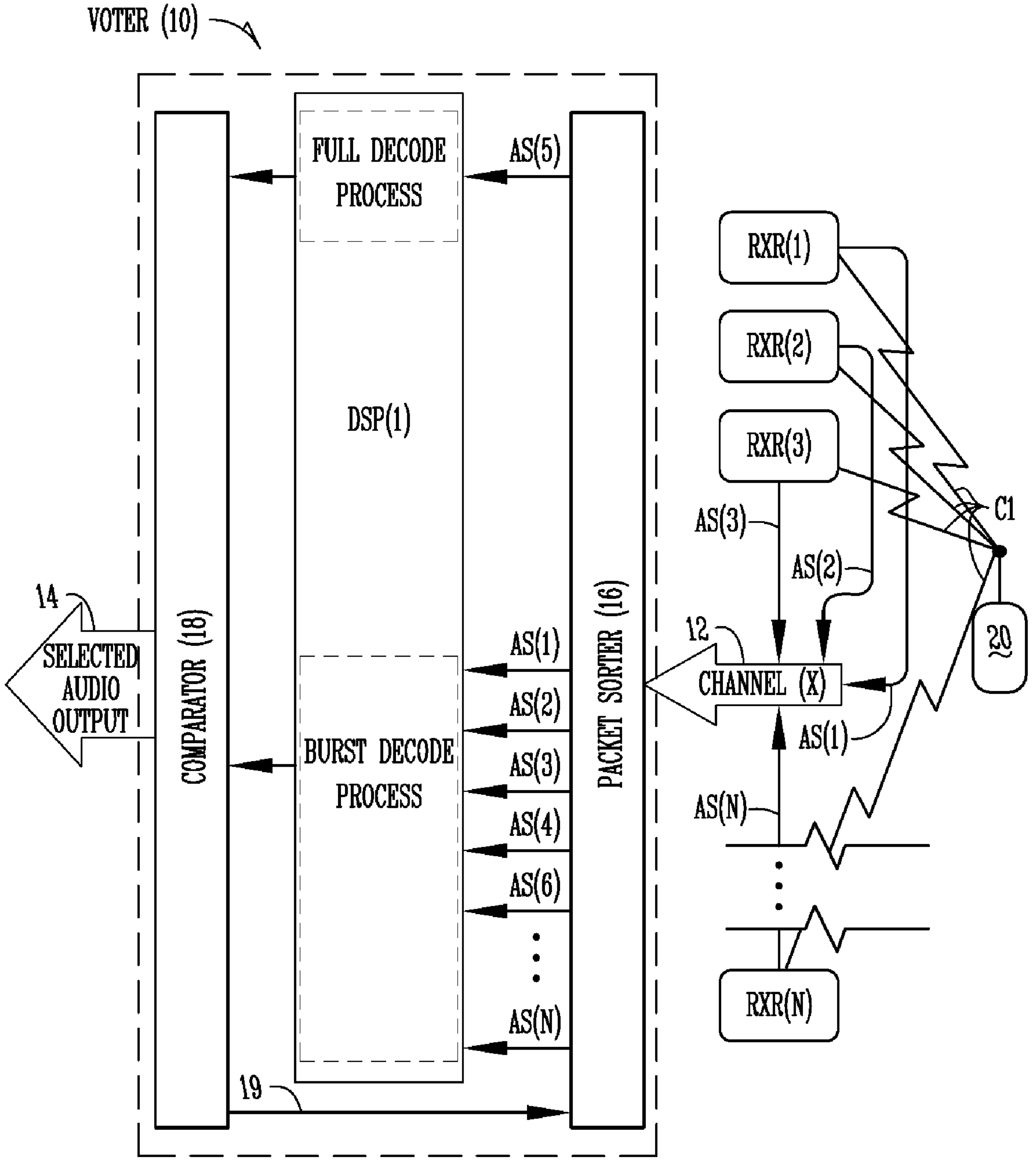
FIG. 2 is similar to FIG. 1 but diagrammatically illustrates a general method according to one exemplary embodiment of the present invention, namely using a full decode DSP process for at least one stream voted to be a higher quality stream and a burst decode DSP process for streams voted to be lower quality.

FIG. 2 illustrates diagrammatically the general principle of one aspect of a method according to an exemplary embodiment of the invention. A comparison with the prior art approach of FIG. 1 shows the major differences.

Voter 10 of FIG. 2 includes what will be called packet sorter 16 in operative communication with a plurality of audio streams, corresponding to audio streams AS(1) to AS(N)) from receivers RXR(1) to RXR(N), all coming through on incoming channel F. The audio streams from receivers RXR (1)-(N) include signaling information in the form of digital data related to the talk back call C1 from mobile subscriber transceiver radio 20 in either standards-based or non-standards-based packets.

An example of such communications is digital-coded squelch (DCS or CDCSS), which superimposes a continuous stream of frequency-shift keying (FSK) digital data on the transmitted analog audio signal. The digital data can include information related to identity of the signal or its receiver and to the signal quality of its signal, as well as other information, such as is known in the art.

In FIG. 2, the different wireless paths of the single talk back call C1 from mobile radio 20 are shown diagrammatically to each receiver RXR(1)-(N). The audio (voice) content of the call C1 from radio 20 is thus usually received by multiple receivers RXR(1)-(N). Audio streams AS(1)-(N) and the encoded data, are sent from the receivers (e.g. via land-line) to voter 10.

a) Packet Sorter 16

Figure 3:
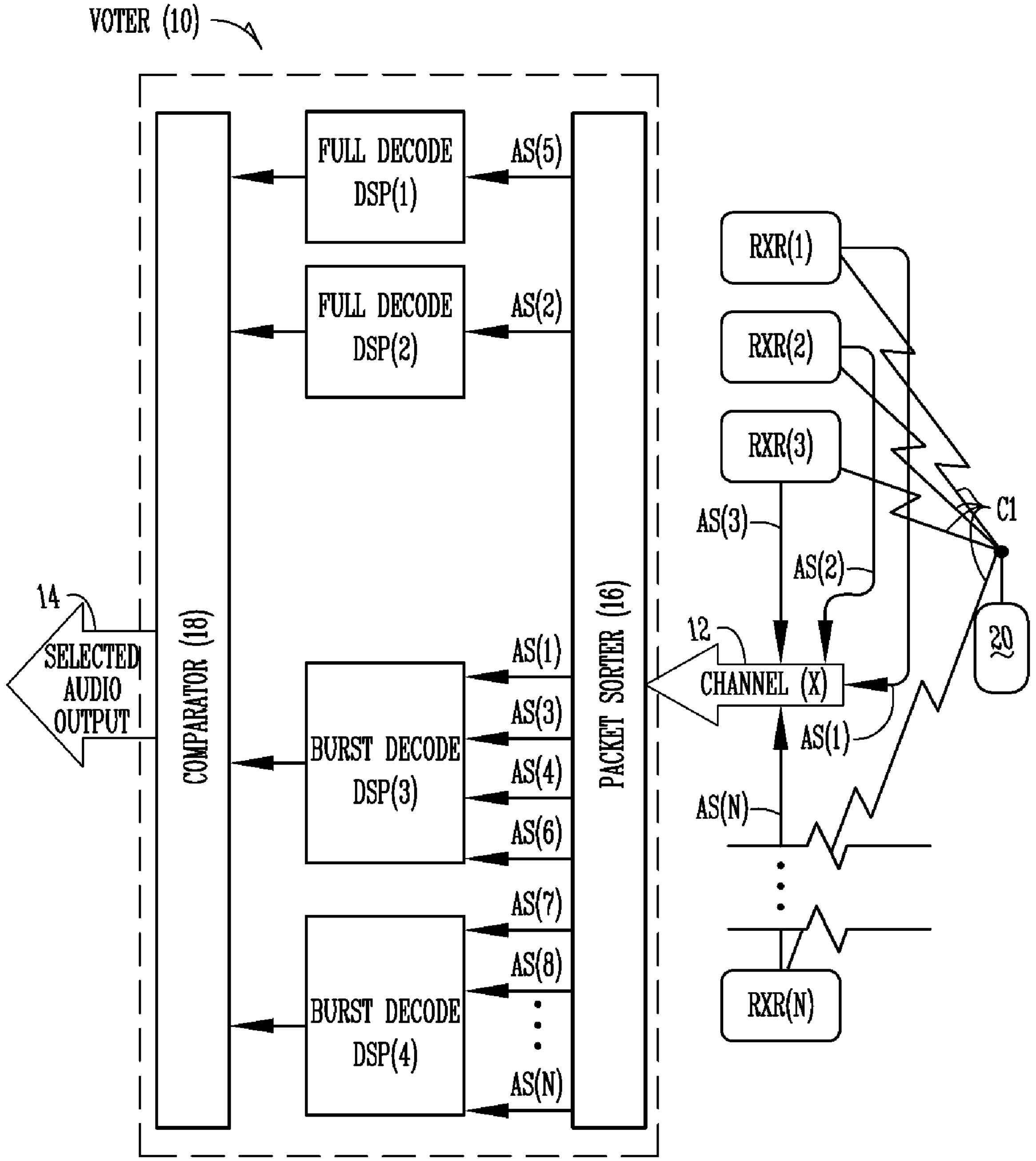
FIG. 3 is similar to FIG. 2 but diagrammatically showing one alternative embodiment of the general method of FIG. 2, namely full decoding of first and second voted primary (higher quality) streams in first and second DSPs, and burst decoding non-primary (lesser quality) streams in third and fourth DSPs.

FIG. 3 is in the context of packet-based communications, where the analog audio content of talk back call C1 is encoded into packets containing digital information representing an encoded representation of a portion of the original voice message. The packets are transmitted in serial fashion along with some system signaling information. See, e.g., U.S. Pat. Nos. 4,630,262 and 5,220,565, both incorporated by reference herein. The packets can be routed by packet-switched network protocol by an appropriate system controller. Each analog audio stream can be reconstructed by using information in the packets and can be routed (sorted) to desired locations or processes, such as is well-known in the art.

Like DSP assignment component 15 of FIG. 1, packet sorter 16 of FIG. 2 is configured to identify the type of signal. For example, voter 10 can be configured to handle not only conventional analog packetized audio but also digital packetized signals. Packet sorter 16 can determine which type and route them accordingly. FIG. 1 illustrates only how packetized analog streams are further processed.

For conventional analog, packet sorter 16 can segregate each unique audio stream AS(1)-(N) and assign each stream to a DSP or DSP process. Packet sorter 16 of FIG. 2 assigns one audio stream to DSP(1), which is configured to include a full decode mode or DSP process, and assigns all others that are received to a burst or batch decode mode or DSP process also in DSP(1). In direct contrast to the one-to-one ratio of audio-streams to full decode DSPs of the prior art system of FIG. 1, the paradigm of FIG. 2 is one audio stream to a full decode DSP process in a single DSP and the remainder of audio streams to a batch decode DSP process in that same single DSP. The reduction in number of DSPs to handle a greater number of incoming streams reduces component costs for the voting comparator of FIG. 2 without reducing the number of streams it can handle. Packet sorter 16 can be implemented in software in a programmable processor in voter 10 or in other ways such as are known to or within the skill of those skilled in the art.

In the context of this description of a general exemplary embodiment of the invention, the term "DSP process" is intended to mean either a process which can be performed by a single DSP or a single dedicated DSP. Therefore, in one sense, with the general method of FIG. 2 a single DSP can be configured and programmed to perform a full decode DSP process on packets from one incoming stream and a burst decode DSP process on packets from one or more other incoming streams. As can be appreciated, this would reduce the number of discrete DSPs needed to handle N incoming streams from N (FIG. 1) to one (FIG. 2). The number N of streams that could be processed by a single DSP with the method of FIG. 2 is primarily limited by the processing requirements needed for the full and burst decoding, and the processing power or capacity of the DSP. Stated differently, a single DSP can be configured to handle both one or more full decode DSP processes and one or more batch DSP processes (per FIG. 2) for as many streams as falls within acceptable processing speed and capacity for that DSP and application.

On the other hand, as appreciated by those skilled in the art, each "DSP process" could alternatively be handled in its own DSP. For example, FIG. 2 also contemplates the full decode DSP process could be carried out in a first DSP and the burst decode DSP process could be carried out in a second DSP.

DSP(1) of FIG. 2 would present to comparator 18, in essentially real time, fully decoded content of at least the digital control data related to a first stream. Comparator 18 can then use that decoded information to quickly and efficiently direct or associate the audio content of the selected stream to output 14. A voting parameter or metric can be programmed into comparator, such as is well known in the art, which decides which incoming stream AS(1)-(N) is the preferred or "voted" stream for presentation at output 14. Alternatively, several voting metrics, a combination of several voting metrics, or an algorithm based on one or more voting metrics, such as will be discussed later, can be used.

As discussed, DSP(1) of FIG. 2 can also be configured to process other streams in burst or batch decode mode. As well-known in the art, burst or batch decode mode would queue up a set of packets, and then burst or batch decode them. There is some inherent delay in queuing up the batch. Therefore, in contrast to full decode mode of the full decode DSP process, which would be essentially in real time, the burst decode mode of the burst decode DSP process may lag the decoding of full decode DSP process. For example, unlike the full decode DSP process which processes packets as they arrive, the burst decode DSP process waits until a pre-set minimum number of packets is accumulated or queued. On the other hand, to save processing power and time, the burst decode DSP process can be programmed to decode only a portion of the digital information related to each audio stream AS(1)-(N). But in this latter mode, burst decode DSP(2) would neither decode in real time nor decode all of the digital information related to each of the audio streams it processes. For example, the burst decode DSP process might only decode the signaling part for each audio stream it handles, e.g. to extract signal quality information. Doing so allows comparator 18 access to information about each incoming streams AS(1)-(N) from which it can rank or vote the preferred stream for presentation to output 14, but without having to use a separate DSP process or separate DSP for each stream. More particularly it requires neither full or real time decode for each stream. Therefore, the burst processed streams are useful to the voter at least to identify if a higher quality signal than the voted stream becomes available. The voter can then take appropriate action to switch real time full decoding to the higher quality stream.

b) Comparator 18

The output of DSP(1) of FIG. 2 is operably connected to comparator 18. Comparator 18 evaluates decoded signal quality information from each of the audio streams AS(1)-(N). Based on a signal quality metric, comparator 18 informs packet sorter 16 (via appropriate feed back 19) whether the audio stream originally assigned for full decode DSP process is the preferred audio stream to be sent to decoded output 14. If so, packet sorter 16 continues to direct packets from that audio stream to the full decode DSP process and the remaining streams to the burst decode DSP process. On the other hand, if comparator 18 determines a different audio stream is preferred (because of the signal quality metric(s)), it would instruct packet sorter 16 to replace the originally assigned stream at the full decode DSP process with the new higher ranked stream so that the best signal quality audio at that time is sent to output 14.

For example, when a call is first made from mobile radio 20, the first signal received at voter 10 might be AS(1) from RXR(1). As a matter of organization, AS(1) could be assigned to the full decode DSP process of DSP(1). The second signal received at voter 10, namely AS(2), could be assigned to burst code DSP process of DSP(1). The third and subsequent signals received at voter 10 would likewise by assigned in order received to the burst code DSP process of DSP(1) so long as the full decode DSP process of DSP(1) is assigned. However, as illustrated in FIG. 2, if comparator 18 subsequently determines audio stream AS(5) is of better signal quality than AS(1), it would promote AS(5) to the full decode DSP process. The original stream AS(1) at DSP(1) would be demoted to the burst decode DSP process and all other streams AS(1), (2), (3), (4), (6), (7), . . . (N) would continue to be decoded in batch form by the burst decode DSP process of DSP(1).

Alternatively, if the full decode DSP process was handled by a first dedicated DSP and the burst decode DSP process by a second dedicated DSP, packet sorter 16 would route (or switch) appropriate packets to or between the appropriate full decode DSP or burst decode DSP.

Comparator 18 could continuously monitor and promote/demote based on its ranking of signal quality. This could be done at regular time intervals. Alternatively it could be based on a different criterion designed into the system; e.g. event-driven. Assuming sufficient power and speed of the DSP(s) relative to the content of the signals, it may be possible to switch between signals in shorter time frames than the duration of a syllable of conventional speech. Thus, the highest quality signal could be pieced together from the plurality of incoming signals on a sub-syllable by sub-syllable basis. This would promote high quality reproduction of the audio content of the call, even if taken piece-meal from signals from different receivers RXR(1)-(N). Additionally, this can be done with only one DSP, even though the number of incoming signals can exceed one, or can be done with two DSPs, even though the number of incoming signals can exceed two, and in fact, can greatly exceed two. As discussed further below, typical LMR voters may be able to handle well above two receivers.

Even if switching between full decode and burst decode streams cannot occur within a typical syllable duration, the configuration of FIG. 2 could switch to the best voted signal as quickly as possible to attempt to keep the highest quality signal at the output. Methods known in the art could be used to minimize loss of audio content.

c) Voted Output

In any event, in the method of FIG. 2, the best signal quality, as determined by voter 10, will thus be made available for further use at output 14. The goal is that the best or preferred signal is identified to provide as high quality audio content of the subscriber call as possible for re-transmittal through a repeater, conversion to audible sound through a speaker at for example a console, or other use.

d) Voting Metric

It is to be understood that the general method according to the exemplary embodiment is not limited to any specific voting metric. It can be any of a number of conventional metrics well known in the art. Non-limiting examples include:

Signal strength;

Signal to noise ratio (SNR);

Out of Band Noise (OOBN);

Received Signal Strength Indicator (RSSI);

Received Signal Quality Indicator (RSQI).

Each of the above is related to signal quality. Other metrics could be used, including other signal characteristics.

It has been found, however, that there is room for improvement with respect to the performance of presently used voting metrics. Examples of alternative voting metrics that are intended to improve over the state of the art are set forth later in this description and could be used with the voting comparator method of FIG. 2, or with other voting comparators whether or not they use the method of FIG. 2.

e) Advantages of FIG. 2 Over FIG. 1

As can be seen by referring to FIG. 2, and by comparing it to the prior art method of FIG. 1, voter 10 of FIG. 2 can operate with just one or two DSPs, independent of the number of audio streams received. In contrast, the prior art methodology of FIG. 1 operates with a like number of DSPs for number of audio streams received. As can be appreciated by the skilled artisan, for any number of audio streams over one or two, the exemplary embodiment of FIG. 2 can reduce the number of DSPs needed relative to the system of FIG. 1.

It is to be understood that voter 10 of FIG. 2 could be programmed to operate to make one preferred signal vote or selection, and then stay with that voted signal for the remainder of the duration of the call. However, this would rely on the assumption that the selected signal will be adequate. As is well known, however, use of a single audio stream for the entire duration of a call may not result in a complete and intelligible reproduction of the call. Therefore, alternatively, voter 10 of FIG. 2 could be programmed to regularly (e.g., at selected intervals or upon designated events) vote between and promote to full decode any of audio streams AS(1)-(N). This would rely upon voter 10 to make as smooth and complete of hand-offs or switches between a promoted stream and demoted stream as possible. It is recognized that time lags in the burst decode DSP process(es) may result in some short loss of audio content during promotion if only one full decode DSP process is used. However, this may be acceptable for given uses or applications.

2. Alternative (Two Full Decode DSP Processes or DSPs)

More seamless transition during promotion may be possible with the alternative embodiment of FIG. 3. Voter 10 of FIG. 3 is similar to voter 10 of FIG. 2, with the following primary differences.

Another full decode DSP process in a second DSP (in FIG. 3 designated as DSP(2)) is added. Alternatively, a second full decode DSP process could be added to the DSP that carries out the first full decode DSP process. Comparator 18 would be programmed to identify (with the desired voting metric) a “best” and a “second best” audio stream from streams AS(1)-(N). Just for purposes of example, in FIG. 3 the two best streams are AS(5) and AS(1), with AS(5) being “best” and AS(1) being second best”. Comparator 18 or some other part of the system would inform packet sorter 16 to direct streams AS(5) and (1) to full decode DSP(1) and (2), respectively, to concurrently fully decode the digital data in them, as well as direct the audio content of stream AS(5) to output 14, as the best quality representation of call C1.

Then, if comparator 18 subsequently decides AS(1) attains better signal quality than AS(5), it could direct packet sorter 16 to promote AS(1) to DSP(1) and/or substitute the audio content from DSP(2) at output 14 for that of AS(5). This could result in smoother transition because voter 10 of FIG. 3 has an essentially simultaneously fully decoded stream to immediately substitute, instead of having to extricate a burst decoded signal from a batch of signals and begin full decoding, as might occur with voter 10 of FIG. 2. However, voter 10 of FIG. 3 still only utilizes two full decode DSPs.

Assuming sufficient processing speed and power, the remainder of streams (those other than AS(5) and AS(1)) could be sent to just a single burst decode DSP (3). In that case, the system would still have only three total DSPs. If the number of possible incoming audio streams exceeds three, a voter with two full decode DSPs and one burst decode DSP would represent an advantage in required number of DSPs relative to the prior art system of FIG. 1.

As indicated, the burst decode DSP process alternatively could possibly be carried out in either a single DSP that carries on both full decode DSP processes, or in a second DSP.

3. Alternative (Two Burst Decode DSPs)

FIG. 3 shows that, optionally, another burst decode DSP(4) (or burst decode DSP process) could be used. This is intended to illustrate that in either the one full decode DSP process voter 10 of FIG. 2, or the two full decode DSP process voter 10 of FIG. 3, if needed or desired a second (or more) burst decode DSP process could be added to split the burst decoding chores. As appreciated by the skilled artisan, comparator 18 and packet sorter 16 can be appropriately configured to know which audio stream goes to which DSP. For example, each audio stream could be ranked according to the voting metric and then assigned by rank; e.g. highest to full decode DSP(1) in FIG. 3, second highest to full decode DSP(2) in FIG. 3, and then the remainder split in some fashion between burst decode DSP(3) and DSP(4) of FIG. 3. The split could be based on rank. Alternatively, the first and second ranked streams could each go to one full decode DSP and the remainder split between two burst decode DSPs based on some other factor; e.g. receiver number, time of arrival, etc. Of course, other assignment paradigms are possible and can be determined by the designer. As indicated, instead of additional DSPs, the plural full or burst decoding could be accomplished with plural full or burst DSP processes in the same DSP, instead of separate dedicated DSPs, if processing power allows.

One possible purpose for the use of multiple burst decode DSPs or processes is to decode relevant parts (e.g. signaling as opposed to audio content) of the non-voted streams as quickly as possible. As discussed further below, the designer can calculate or obtain the processing capacity of the DSP and select the number of burst decode DSPs or processes to be used. Other reasons for splitting the streams between multiple batch decode DSPs or processes are possible. One example might be if the designer wanted one voter 10 to process well in excess of the normal number of incoming streams, i.e. increase the number of streams a single voter can handle.

In any event, the general example described above illustrates use of a limited number of DSPs (or DSP processes) relative to the number of streams that could be DSP processed. It could be as few as one DSP, having one full decode DSP process and one burst decode DSP process. It could be one DSP having one or more full decode DSP process(es) and one or more burst decode DSP process(es). It could be two DSPs, each having one or more full decode DSP process(es) and the other having one or more burst decode DSP process(es). It could be three DSPs (e.g. two with a full decode DSP process and one with a burst decode DSP process, or vise versa). It could be four DSPs, with two dedicated full decoding and two dedicated to burst decoding. Other numbers of DSPs, each with single or multiple full or burst decode DSP processes are, of course, possible. Each of these cases uses a limited number of DSPs to process the number of potential incoming audio streams for conventional analog LMR systems. Therefore, the designer may select the number of full and burst decode DSP processes, as well as the number of DSPs. The designer may select more than one full decode or batch decode DSPs or processes for the advantages any of them can have, but still remain under a one-to-one ratio of DSPs or DSP processes to incoming streams.

C. Specific Example

1. Overview

This example will be described in the context of a two full decode DSP/two burst decode DSP paradigm of FIG. 3, but in further reference to FIGS. 4, 5, 6A, 6B, 7A, and 7B. It is intended to describe primary aspects of a specific implementation of the general method of FIG. 3.

The system of this example is intended to be a component in the infrastructure of an LMR system (see FIG. 5) that can handle at least conventional analog communications. A primary feature of the system is that it can compare homogenous radio streams AS(1)-(N) relayed from a single source (subscriber mobile or portable radio unit 20), and select the stream with most desired characteristics. The voter 10 can also detect receiving stations processing streams from different sources. In situations where streams are received from multiple sources at the same time, voter 10 will use priority, and configurable rules of preemption and ruthless preemption to determine which call stream should take over the channel. These types of rules are well known in the art, and will not be explained in further detail.

Figure 5:
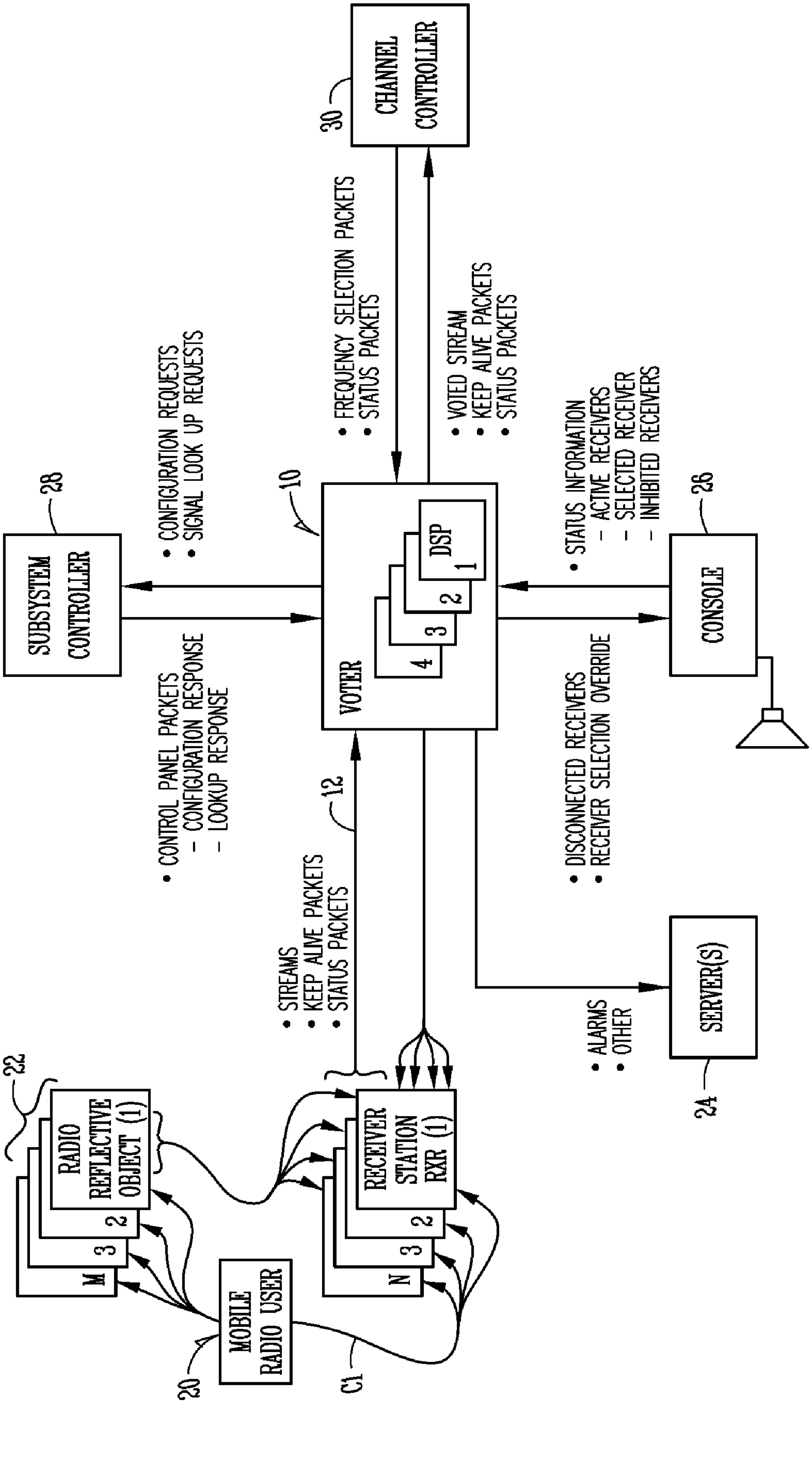
FIG. 5 is a block diagram of the components of a system for practicing the method of FIG. 3.

In this embodiment, voter 10 is operatively connected to at least one from the set comprising: subsystem controller 28, channel controller 30, console 26, receivers RXR, and one or more servers 24 (see FIG. 5). Subsystem controller 28 is a device or application which provides voter 10 with configuration information and/or information regarding allowed system users and their privileges. Channel controller 30 is a device or application which provides voter 10 with information regarding frequency selection and/or takes over the voted stream. Console 26 is a device or application which may override the voter's receiver selection or prevent voter 10 from voting on selected receivers. Receiver RXR is a device or application which relays the signal from mobile radio 20 to voter 10. Server 24 is a device or application which electronically stores data and may be remotely accessible to voter 10. All of these peripherals of voter 10 are capable of communicating status information regarding their connectivity to voter 10.

Voter 10 is accompanied by browser-based management software which will allow for remote configuration, administration, and maintenance of the voting system. This software can be used to monitor the voting system, control the voting system, view system alarms, and generate statistical reports. Monitoring features include the ability to remotely detect which receivers are connected, which receivers participated in a call, and the receiver selected by the voter. Control features include the ability to disable or forcibly select receivers. Maintenance features include system alarms, call trace log, and statistics generated per receiver site. Others are, of course, possible.

Voter 10 also generates alarms regarding system malfunctions such as receiver or link failure, DSP failure, socket failure, or other noteworthy occurrences. Voter 10 will record statistics on system performance such as the number of votes per variable unit time, number of votes per call type, number of missed packets, number of filler packets generated, the time out of service, and other metrics relevant to voting.

It is foreseen that voter 10 could be configured to operate in a system with infrastructure different from the present embodiment; be it more, less, or different components. There are a great many methods in which someone skilled in the art could put to use a voter capable of comparing the signal characteristics of a number of streams requiring digital signal processing greater than the number of DSPs of which the voter has access.

In this example, voter 10 supports over four receivers RXR operating on a single frequency. It is understood that with minor adjustments, including but not limited to adding additional DSPs, restricting the number of CTCSS or CDCSS tones, or increasing the network variance time, the voter could support more receivers; over ten and possibly over twenty.

In this example, voter 10 utilizes four DSPs. As with the embodiment of FIG. 3, two of the DSPs are allocated for real-time decoding of at least control data of the two highest quality (quality is determined by metrics and algorithms described later) signals and are termed "full decode" DSPs. One of these two full-decode DSPs handles the digital data related to the "selected" or "voted" stream. The audio content of this "selected" or "voted" stream is relayed to the channel controller 30 for transmission to the intended recipients. The second full decode DSP (DSP(2)) handles another highly ranked stream (e.g. "next best"). The remaining two DSPs are allocated for batch decoding of queued packets from streams not selected for full-decode. These DSPs are termed "burst decode" DSPs. The audio content from the stream associated with the other full decode DSP or the burst decode DSPs is discarded or ignored. However, the signaling information related to signal quality of these signals is used to periodically rank all streams.

2. Communication Protocols

A variety of communication protocols could be used for the subscriber call C1. Several analog protocols have been previously mentioned (e.g. CTCSS and CDCSS). Others are, of course, possible, both standards compliant and not.

The receivers RXR can use a variety of encoding methods for the analog audio content of the streams and/or sub-audible signaling information (e.g. subscriber I.D., signal quality metric, receiver ID, etc.). Several examples are Mu-Law pulse-code modulation (PCM) and Linear PCM. Others, of course, are possible and are well-known in the art. See, e.g., U.S. Pat. No. 5,220,565.

A plurality of communication protocols can be used to send and receive packetized information, including control plane packets and/or bearer plane packets to and from peripheral devices operatively connected to voter 10. One is the TCP/IP protocol suite, such as is well-known. See, e.g., U.S. Pat. Nos. 6,173,431, 6,847,827, and U.S. Published Application 2002/0262771, all incorporated by reference herein. The TCP/IP protocol suite includes such protocols as UDP (User Datagram Protocol) and RTP (Real-time Transport Protocol). Numerous other protocols presently exist under the TCP/IP protocol suite. Customized protocols could be used.

Voter 10 receives control plane packets from local subsystem controller 28 through two ports (input and output). The control plane packets communicate to voter 10, which subsystem controller 28 is its main subsystem controller. The control plane packets provide voter 10 with configuration information and information regarding allowed system users (subscribers) and their privileges. Requests regarding subscribers are sometimes referred to as signal lookups or lookup requests. Voter 10 sends signal lookup and configuration requests to local subsystem controller 28 through the output port.

Voter receives frequency selection packets and status packets from local channel controller 30 through an input port. Voter 10 uses the frequency selection packets and status packets to determine current channel frequency selection and to monitor connectivity with channel controller 30. Packets serving to verify operative communication are termed "keep-alive" packets. Voter 10 sends keep-alive packets, status information, and bearer plane packets to local channel controller 30 through a port termed RXOUT using UDP protocol.

Voter 10 receives keep-alive packets, status information, and bearer plane packets from the receiver[s] RXR(1)-(N) through a port termed RXIN using the UDP protocol. Voter 10 sends frequency-selection and status packets, which also serve as keep-alive packets, to the local receiver[s] through another port.

Voter 10 receives information indicating which receivers to remove from voting selection or receiver selection override from the console via a port. Voter 10 sends status information indicating the active receivers, selected receiver, and disconnected receivers.

Figure 4:
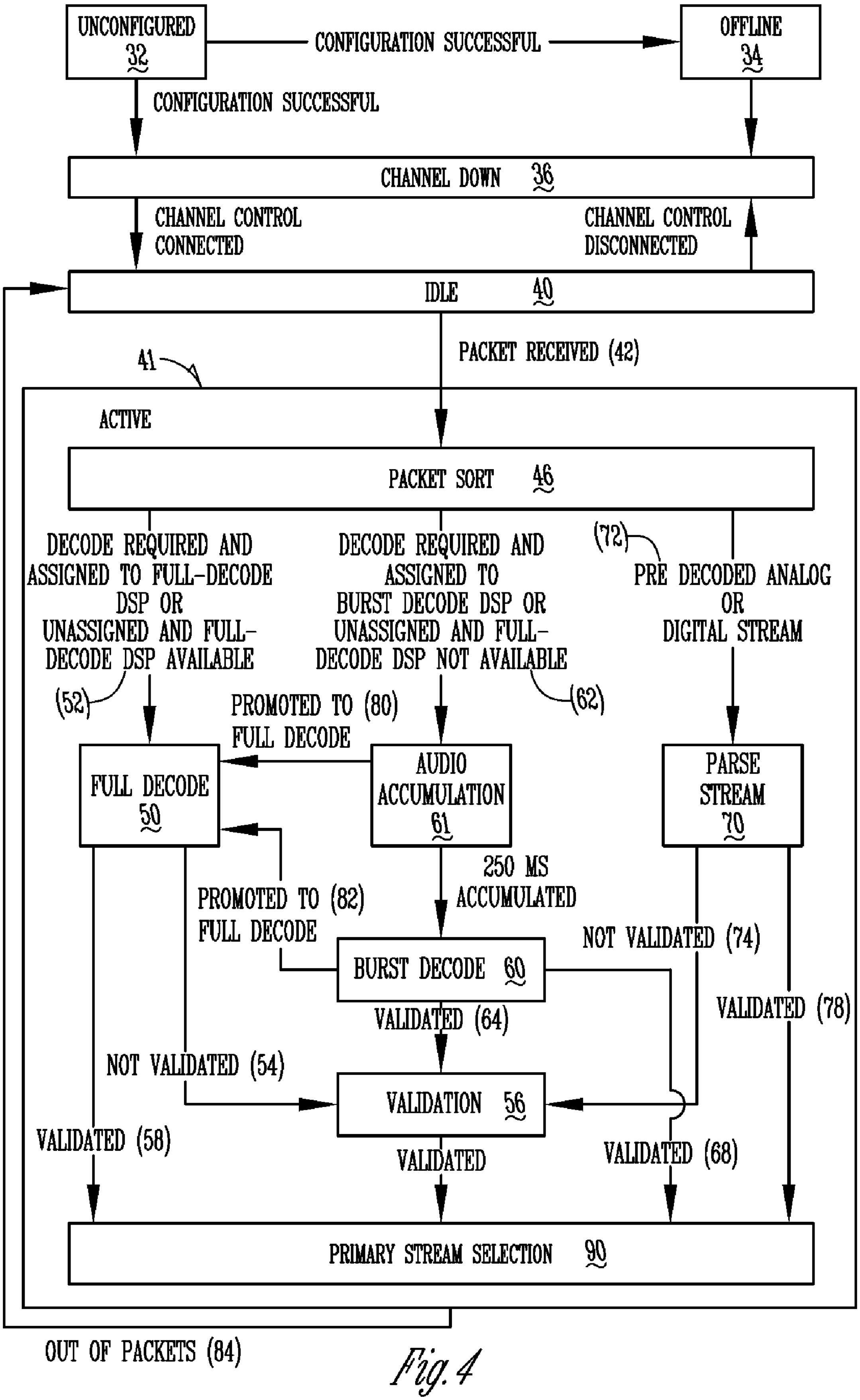

FIG. 4 also indicates that mixed mode or digital protocols can be handled by voter 10, as will be discussed further below.

3. Operation

Voter 10 has a plurality of states in which it operates (see FIG. 4). The current state is determined by the previous mode and/or specific conditions. Each state has specific roles and areas of operation within the voting process. Voter 10 utilizes various "tasks" which are responsible for carrying out specific functions.

This description will describe the states of operation in view of the five basic tasks performed by the voter will in the active state. When not active, the system has what will be termed inactive states which are briefly summarized below.

4. Inactive States a) Configuration State (32)

Voter 10 is optionally able to download configuration information from a central database. To access this configuration information voter 10 connects to the main subsystem controller 28. If voter 10 has lost contact with main subsystem controller 28, it is not able to access this configuration information and will be in the UNCONFIGURED state (FIG. 4, ref. no. 32). Voter 10 can also be configured to a default state.

b) Offline/Online States (34)

Voter 10 has a configuration option to put voter 10 online or to take it offline. If voter 10 is set to be offline it is in the OFFLINE state (FIG. 4, ref. no. 34). While in the OFFLINE state, voter 10 does not send any control or bearer plane packets. Voter 10 still receives packets from peripherals and maintains the state it would be in should voter 10 be put back online.

c) Channel Down State (36)

If voter 10 does not have a connection with the local channel controller, then voter 10 will be in the CHANNEL DOWN state (FIG. 4, ref. no. 36). Voter 10 will consider the connection with channel controller 30 lost if it stops receiving packets to decode for a predetermined amount of time; for example three seconds or more. If voter 10 cycles to the CHANNEL DOWN state (36), voter 10 status displays an alarm and an alarm will be generated.

While in the CHANNEL DOWN state (36), voter 10 does not send control plane packets to the local receiver[s] RXR (1)-(N). Voter 10 continues to send keep-alive packets to channel controller 30 in case channel controller 30 was taken off line temporarily so that channel controller 30 would continue to monitor receipt of these packets. If a connection still exists between voter 10 and local subsystem controller 28, then voter 10 will continue to process control plane packets from subsystem controller 28.

d) Idle State (40)

If voter 10 is configured (32) and online (34), but is not receiving bearer plane packets, then voter 10 is in the IDLE state (40). Voter 10 sends and receives control plane packets while IDLE. Voter 10 will transition from the IDLE state to the ACTIVE state (41) as soon as bearer plane packets are received while voter 10 is configured and online. In the ACTIVE state (41), voter 10 processes control and bearer plane packets. There are several sub-states within the active state.

5. Active State (41)—(States and Tasks)

When active, voter 10 performs the following tasks: RXIN Task, DSP Tasks, Validation Task, Stream Selection Task, and RXOUT Task. Each will be discussed below.

a) RXIN Task

The RXIN task opens a listening socket on voter 10 to receive keep-alive (null payload) packets or audio packets from the local receivers RXR(1)-(N). This task is responsible for monitoring connection status of the local receivers. Additionally, this task sorts the received audio streams based on where the packets need to be queued.

When the first packet of each stream is received, the RXIN task must first determine if the stream needs to be decoded by a DSP. If so, then the task determines if the stream has full or burst-decode status.

A feature of voter 10 is its ability to handle different types of signals and packets. Digital packets or analog packets that do not need to be decoded are queued directly to the Validate task (FIG. 4, ref. nos. 70 and 72).

Packets destined for full-decode are queued to the assigned full-decode DSP task as they are received. If this stream was previously a burst-decode stream, then it is possible there were some packets accumulated for burst decode processing. All accumulated burst decode packets are discarded as they are most likely old. Packets destined for burst-decode are stored in a list until enough packets are queued, then all the stored packets are queued to an IDLE burst-decode DSP task in a batch.

b) DSP Tasks

There are four identical DSP tasks within voter 10, each one controlling one of the DSPs. Information as to how to process the packets (burst or full-decode) is stored and available to voter 10. In this example, the voter DSP tasks will support receipt of both LPCM and Mu-Law PCM packets. Other packet protocols or audio encoding methods are, of course, possible. The DSP tasks will initialize the DSP according to the received audio format and decode mode at the start of each audio stream if in full-decode mode, or at the start of each ‘burst’ if in burst-decode mode.

(1) Full Decode (50)

The FULL-DECODE sub-state (50) handles real-time full decoding of streams requiring digital signal processing and which either is (a) unassigned and a full decode DSP is idle and available or (b) assigned to a full decode DSP. Full-decode DSPs are dedicated to individual streams and decode packets, typically 20 milliseconds of audio, as they are received. See, e.g., information about packet encoding of voice at U.S. Pat. Nos. 5,220,565 and 4,630,262, both incorporated by reference herein.

In this manner, up to two streams can be simultaneously fully decoded (50) in two DSPs (1) and (2) and, thus, immediately available relative to selection of a voted audio output.

(2) Burst Decode (60)

Similarly, The BURST-DECODE sub-state (60) handles burst decoding of portions of streams requiring digital signal processing and the stream either is (a) unassigned and no full decode DSP is idle but a burst decode DSP (3) or (4) is idle and available or (b) assigned to a burst decode DSP. In order to burst-decode a stream, enough packets must be queued to ensure the DSP will be able to decode the signaling from the stream during the “burst.” This is handled by the AUDIO ACCUMULATION sub-state (61). In this example eighteen packets, or 360 ms of signal, must be queued before a burst-decode. This amount can be varied by the designer.

The BURST-DECODE sub-state (60) is responsible for the batch decoding, and thus not “real time” decoding, of streams requiring digital signal processing. Voter 10 monitors the received burst-decode assigned streams. As soon as the required number of packets is queued, the stream will be dispatched to an burst-decode DSP. If no burst-decode DSPs are available to decode a stream, then packets for that stream will continue to be queued until a burst-decode DSP becomes available. Once a burst-decode DSP becomes available, the most recent required number of packets will be sent to the available burst-decode DSP task. This allows the most recent packets to be decoded for signaling characteristics, as they are the most relevant. Older packets are discarded because they are no longer relevant.

Thus, depending on configuration and capacity, one or more streams (including greater than two) can be processed in two DSPs (3) and (4). The nature of the processing can be burst decoding of only a selected part of each stream (e.g. the minimum information regarding identity and signal quality of each stream). In this manner, only two further DSPs are used to capture information needed by voter 10 to continuously evaluate all the streams for best signal quality without using processing power to fully decode each complete stream.

Figure 6A:
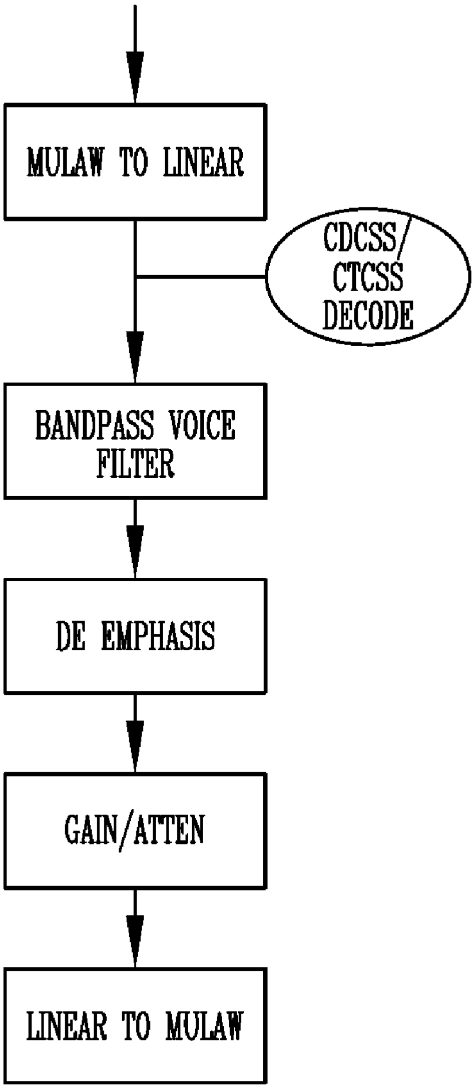
FIG. 6A is a block diagram of one exemplary full decode DSP process for a compressed Mu-Law PCM audio stream.
Figure 7A:
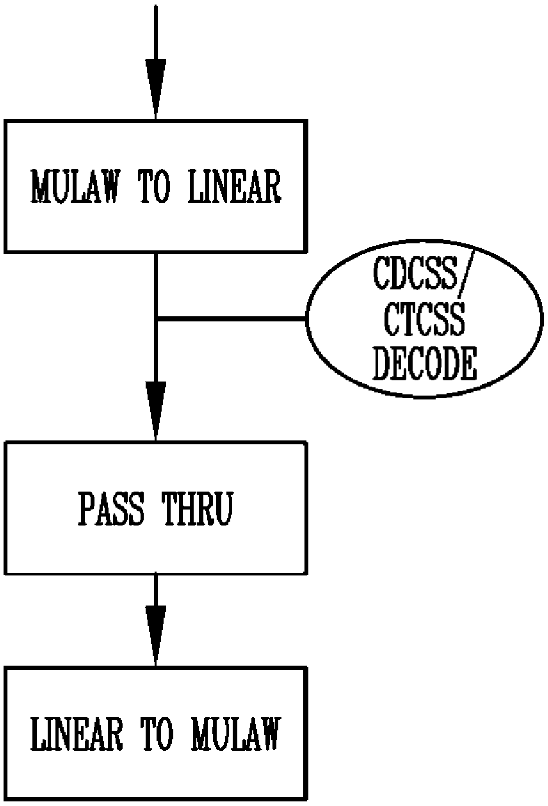
FIG. 7A is a block diagram of one exemplary burst decode DSP process for a Mu-Law PCM audio stream.

Examples of differences in full and burst decoding for Mu-Law PCM packets are illustrated by comparing FIGS. 6A and 7A. If the inbound signal is received as Mu-Law PCM, the DSP functions of the block diagram of FIG. 6A are used if the relevant DSP or DSP process is in full decode mode. In comparison, if in burst decode mode, the DSP functions according to the block diagram of FIG. 7A. The packets are only decoded to determine the signaling. These packets are never passed on for selection. Therefore, it is not necessary to waste DSP processing power filtering, de-emphasizing, or adding gain/attenuation to the audio (compare FIG. 6A with FIG. 7A).

Figure 6B:
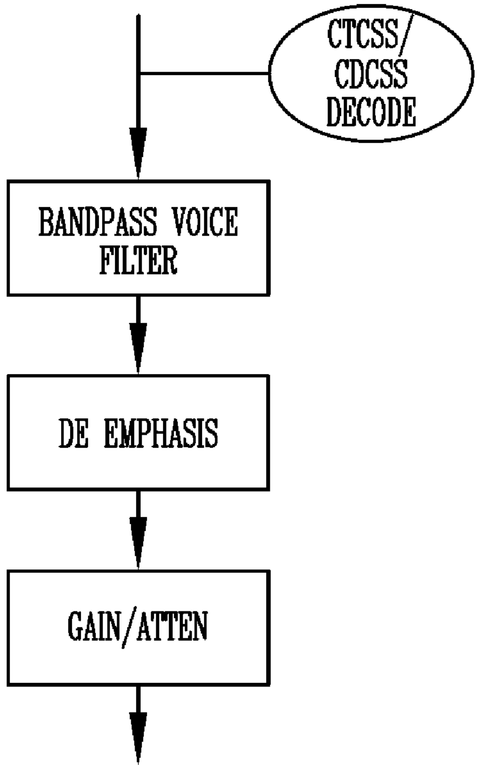
FIG. 6B is a block diagram of one exemplary embodiment full decode DSP process for a non-compressed linear PCM (LPCM) audio stream.
Figure 7B:
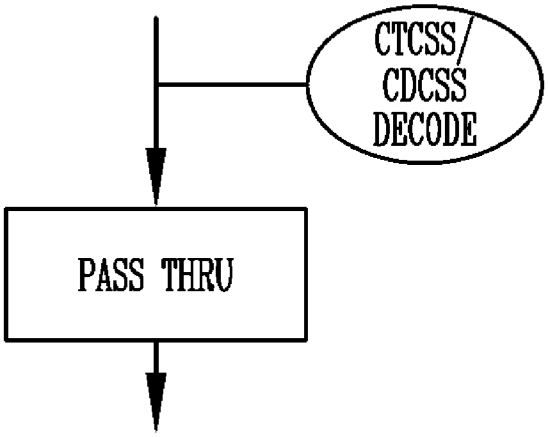
FIG. 7B is a block diagram of one exemplary burst decode DSP process for an LPCM audio stream.

Similarly, FIGS. 6B and 7B contrast handling of linear PCM (LPCM) packets in full decode and burst decode modes, respectively. Power filtering, de-emphasizing, or adding gain/attenuation to the audio in LPCM full decode mode (FIG. 6B) is eliminated in LPCM burst decoding (FIG. 7B).

It is to be appreciated that there may be a practical limit on the number of streams a burst decode DSP (3) or (4) can handle. For example, if CTCSS signaling is used relative the subscriber call C1, the maximum number of streams that voter 10 is able to burst-decode during each packet interval (20 ms) may depend on the number of CTCSS tones that the DSP has to search for. It takes approximately 238 μs to decode each CTCSS tone. In this case the maximum number of receivers that may be supportable is calculated as follows:

---

NUM_RECEIVERS_SUPPORTED = ((20 / (NUM_SUPPORTED_CTCSS_TONES * 0.238)) * NUM_BURST_DECODE_DSP) + NUM_FULL_DECODE_DSP

Where

NUM_SUPPORTED_CTCSS_TONES is a variable representing the number of CTCSS tones.

NUM_BURST_DECODE_DSP is a variable representing the number of burst-decode DSPs.

NUM_FULL_DECODE_DSP is a variable representing the number of full-decode DSPs.

20 represents the packet interval in milliseconds.

0.238 represents the approximate decode time in milliseconds for each CTCSS tone, and NUM_RECEIVERS_SUPPORTED is the resulting number of receivers supported.

---

In this example, if voter 10 will decode 42 CTCSS tones, the maximum number of receivers it could support would be six. If the number of CTCSS tones is 3, the number of receivers is 58. Therefore, this allows the designer (or user) to select from a substantial range of number of receivers. In particular, use of a subset of possible CTCSS tones reduces the amount of time it takes to decode each packet thus allowing more streams to be burst decoded within each packet interval.

If no previous batches (bursts) have been decoded for an audio stream, or if the previous bursts were decoded, but the signaling has changed in the current burst, then the packets will be submitted to the VALIDATION sub-state (56) (see below). If previous bursts have been decoded and if the signaling in the previous bursts was the same as the signaling in the current burst, then the burst packets will be sent to the STREAM SELECTION sub-state (90) (see below).

(3) Promotion/Demotion (80/82)

A stream that is being burst-decoded can be selected as the primary stream and be re-directed to a full-decode DSP. This allows voter 10 to at least periodically (e.g. regularly spaced apart voting times) "promote" the best signal to the output, even if this switches between streams during the duration of a call. The designer can select the length of time between voting times, or use some other parameter or criterion to trigger a vote. In this example, promotion is caused by a stream becoming ranked higher than another stream in signal quality by stream selection (90). More particularly, the best or selected stream is the highest ranked stream at a given voting time.

Conversely, if a stream is promoted, another stream may have to be demoted. This is described in more detail in the stream selection section below. For example, because full decode DSPs (1) and (2) are dedicated to one stream, if a stream is promoted to either DSP, the existing stream must be switched or demoted if ranked lower. Many times this will involve the demoted stream being switched to a burst decode DSP (3) or (4).

There are several ways to handle promotion and demotion. Examples are as follows.

There can be a variance between receivers RXR as to when they lock onto a stream. This can result in a variance in the amount of time it takes for a DSP to decode the signaling in the stream. Because of this, one stream could be delayed longer than another stream while waiting to decode signaling. To minimize audio disruption when switching between audio streams, all packets decoded prior to signal detection can be discarded.

DSPs can decode faster than the speed at which packets arrive. Because burst-decode DSPs decode in batches, they can operate at a much higher efficiency than DSPs decoding in real-time. The batch decode DSPs can be configured to only decode the signaling information for the streams it handles. This allows the burst-decode DSPs to efficiently handle multiple streams.

If one of the streams in the AUDIO ACCUMULATION sub-state (61) is promoted to a full-decode DSP, then all packets accumulated for burst-decode DSP can be discarded as they are most likely be old and lag behind the active radio stream.

If a DSP task designated for burst-decode detects that the stream it is processing has switched to "selected" status, then it will discard the rest of the packets from this stream as the new packets from this stream will be queued to a full-decode DSP Task.

Once the DSP task determines the signaling in the audio stream, the most recent three packets are queued to the Validate task while the older packets can be discarded. The older packets are discarded to reduce audio disruption when switching streams and also to prevent overloading the transmitter with a backlog of packets.

A special case occurs when a previously burst-decoded stream is promoted to full-decode status. When this occurs, the newly assigned full-decode DSP task will assume the same signaling determined from the burst-decode DSP task until the full-decode DSP task re-decodes the signaling. This is done to reduce audio disruption when switching receivers, and also allow packets from a newly selected receiver to be used immediately rather than waiting for the new DSP to re-decode the signaling.

c) Validation (56)

The Validate task is responsible for validating the information in the packets to ensure the packets are valid for the channel. When one call is picked up by multiple receivers (i.e. multiple homogeneous streams), the Validate task will perform one subscriber look up for each call and the source and destination information received in response to the lookup will be copied to each homogeneous stream that was generated as a result of the call. The Validate task will determine a stream to be homogeneous in the following steps.

If the signaling is digital and the source identification (Source ID) of one stream by a first receiver matches the Source ID of a stream received at the same time by a second receiver, then the streams are considered homogeneous. If the signaling is analog, and the signal type (a pre-determined parameter) of one stream by a first receiver matches the signal type of a stream received at the same time by a second receiver, then the streams are considered homogeneous.

Once the priority of the call is determined (as described above), then the Validate task will select the highest priority call from a list of all active calls. If preemption or ruthless preemption is enabled, then higher priority calls will be allowed to preempt lower priority calls already in progress.

All packets from homogeneous audio streams of the call selected during the priority selection process will be queued to the Stream Selection task (90), described further below. Information about each homogeneous stream to participate in the quality stream selection process is added to an active call list.

The "validation" process is further illustrated in FIG. 4. Once a stream is initially decoded, or immediately upon detection of a change in signaling (e.g. its signal quality), the stream will be submitted for the VALIDATION state (56). Once a stream has been validated and, so long as the signaling in the stream remains constant, the decoded packets from that stream will be dispatched for the STREAM SELECTION state (90).

Voter 10's VALIDATION sub-state is comprised of different modes, Normal and Fall-back, which handle various contingencies in stream validation. If there exists a connection with subsystem controller 28, the VALIDATION sub-state (56) will operate in Normal Mode. In Normal Mode, signal validity and priority will be taken into account when voting on streams. For un-decoded analog packets, signal validation and priority verification will be performed as soon as the signaling type and destination are decoded by a DSP. This information can be contained in the header portion of a UDP packet.

In order to retrieve validity and/or priority information about the signaling, voter 10 requests local subsystem controller 28 to lookup the subscriber and/or talkgroup information from a local database. The subsystem controller 28 responds with the requested information. This lookup information is stored in an appropriate location to be used in the STREAM SELECTION sub-state (90).

In addition to retrieving validity and priority information from the database, the VALIDATION sub-state (56) can also validate other control information to ensure the received packets are valid for the selected frequency, subsystem, and channel. Any streams that are found to be invalid are flagged as invalid for the stream and the packets are discarded. All decoded and validated streams are submitted to the STREAM SELECTION sub-state (90).

If there is no connection established with local subsystem controller 28, then voter 10 resorts to a default or Fall-Back Mode Validation, e.g., to validate UDP control information and signal type on the currently selected frequency, subsystem, and channel by referencing local configuration information but does not perform subscriber or talkgroup lookups.

For digital packets, signal validation and priority verification will be done as soon as non-errored source ID and destination ID have been received.

The validation process allows control over users of the radio system. It also allows the ability to over-ride the voter by substituting a call deemed by the system to have a higher priority, as opposed to higher signal quality. This feature is common and well-known in the art. It is used, for example, in law enforcement or emergency response situations.

d) Stream Selection (90)

The Stream Selection task (90) is responsible for handling the quality selection process. This task receives packets from homogeneous streams and selects one stream with the highest quality metrics that meets requirements, as programmed by the designer. Two examples are hysteresis and minimum vote time requirements, such as are known in the art. The voter application maintains information about the currently selected stream. Additionally, it maintains information about all of the homogeneous streams that are contending for quality stream selection.

Each new call that is received will start off in a “Hold” state until an initial voting time or “Vote Deadline” is reached. Once the vote deadline is reached, the Stream Selection task (90) searches through the list of participating streams and selects the stream with the best quality as per the analog or digital voting algorithm. At that point, the most recent four packets from the “Selected” stream are queued to the output or RXOUT task while the packets from the non-selected streams are discarded. Any packets tagged as having been burst-decoded will also be discarded as they may contain old audio.

A background timer is running which times out each preset minimum vote time interval. When this timer expires, the Stream Selection task (90) will re-evaluate the highest quality audio stream. When a receiver switch (a stream is to be promoted) is determined, the following steps are taken.

In this embodiment, several programmed rules can be used for stream selection and stream promotion or demotion. Examples are as follows.

If the newly selected stream was already a full-decode stream, then the previously selected stream is changed from “Selected” to “Full-Decode” status while the newly selected stream is changed from “Full-Decode” to “Selected” status. If the newly selected stream was a burst-decode stream, then the Stream Selection task will do the following.

If a full-decode DSP is available, then the newly selected stream will be assigned to this DSP. The previously selected stream is changed from “Selected” to “Full-Decode” status and the newly selected stream is changed from “Burst-Decode” to “Selected” status. If a full-decode DSP is not available, then the stream with “Full-Decode” status is changed to “Burst-Decode” status and the DSP assigned to this stream is re-assigned to the newly selected stream. The stream with “Selected” status is changed to “Full-Decode” status, and the newly selected stream is changed to “Selected” status.

The STREAM SELECTION sub-state (90) (see FIG. 4) encompasses the task of evaluating the individual streams and subsequently selecting the primary or voted stream that is sent to the channel controller 30 (FIG. 5). Each time a packet is queued to the STREAM SELECTION task (90), the task become active and compares all active streams to determine which stream has the best metrics to become the selected or voted stream (see FIG. 3, ref. no. 14). The software can create a flag to indicate if the stream is selected or not. If a received packet is not part of the selected stream, then it will be discarded. If the received packet is part of the selected stream, then the packet will be queued to a task which will send it to channel controller 30.

In this example, different considerations can be used or weighed when rating a stream, including but not limited to the following: Signal Priority, Error Count, Received Signal Strength Indicator (RSSI), Out of Band Noise (OOBN), and Signal-to-Noise Ratio (SNR). Due to different considerations for different stream types, different means are used for rating different stream types. The system therefore utilizes what will be called specific “signal quality metrics” in the stream selection or voting process, as will be discussed below.

(1) Signal Quality Metrics

Table 1 below shows the metrics that are provided by the receiver and used for un-decoded analog packet voting in this example. These metrics are used to choose between different homogenous streams. Streams are determined to be homogenous if they are identical signals from the same radio frequency source. As shown in Table 1, each metric has strengths and weaknesses. It is the goal to combine these metrics in a fashion that optimizes their effectiveness.

TABLE 1

Analog Voting Metrics

| Metric | Description | Dynamic Range | Strength | Weakness |
|---|---|---|---|---|
| Out of Band Noise (OOBN) | A measure of the quantity of noise detected outside of the normal channel bandwidth. The presence of this noise indicates that there is noise energy in the decoded signal. | ~30 dBm | Low signal quality indication | Above a certain dB SINAD the modulated signal can cause false noise indications. |

TABLE 1-continued

| Analog Voting Metrics | | | | |
|---|---|---|---|---|
| Metric | Description | Dynamic Range | Strength | Weakness |
| Signal-to-Noise Ration (SNR) | A measure of the amount of in-band signal compared to the amount of in-band noise on the received signal. | ~30 dBm | Actual measure of signal quality | Takes a while to find gaps in speech to measure noise level. |
| Received Signal Strength Indicator (RSSI) | A measure of the amount of receiver energy that is measured at the RF front end (before FM demodulation). | >80 dBm | Fast and allows finding really strong signals | Below a certain db SINAD the signal moves around with the modulated signal. High RF signal level doesn't necessarily equate to good sound quality. Can vary over temperature and between different units. Can have variability between different radio frequency (RF) components. |

Any of the individual voting metrics could be used with the methodology of using a limited amount of DSPs for full decoding and a limited amount of DSPs for burst decoding. Alternatively, using the recognitions of differences between the metrics of, for example, Table 1, one voting metric could be used in some situations and a different in other. A specific example would be to program voter 10 to (a) use OOBN as the metric for signals measuring below the certain dB SINAD level the modulated signal can cause false noise indications and (b) use RSSI as the metric for signals above that certain dB SINAD. The certain dB SINAD can be determined by empirical or other testing. In this example the certain dB SINAD for voter 10 related is 12 dB SINAD.

However, according to this example, a voting metric algorithm will be used which is based on a combination of individual voting metrics. The algorithm will be based on averages. A moving average will be kept for each of the metrics listed in Table 1 based on the metrics received in the most recent variable window of packets. If a packet is missed from any of the contending receivers, voter 10 will inject a packet of silence with the worst case metrics for each missed packet to negatively affect the rating of receivers that are experiencing network problems. Voter 10 will also store a trend parameter for each active receiver which indicates if the metrics are on a positive or negative trend. In situations where competing receivers have very similar signal quality metrics, voter 10 will take into consideration the trend, selecting receivers that are on a positive trend.

OOBN is a metric where a lower value translates to a higher quality signal. The analog voting algorithm in this example relies on metrics where a higher value translates to higher quality. To compensate, the OOBN metric received from the receivers is subtracted from the maximum OOBN value to provide the OOBN energy component with a higher value translating to higher quality.

The algorithm for analog packets can also contain tunable constants that can be changed depending on different preferences. These constants are as set forth in Table 2.

TABLE 2

| Tunable constants | |
|---|---|
| OOBN_MINSINAD | This is the value of the OOBN energy component at the point at which the OOBN is least susceptible to talk down. |
| OOBN_HIGH_CONTRIB | This is the amount of weighting given to the OOBN energy component of the voting comparison for highly trusted OOBN energy readings. This is intended to be large compared to other contribution amounts. |
| OOBN_LOW_CONTRIB | This is the amount of weighting to give the OOBN energy component in the least trusted range. This range is susceptible to talk down so it is intended to be substantially less then the high contribution of OOBN energy amount. |
| RSSI_CONTRIB | This is the amount of weighting that RSSI metrics is given in the voting comparison. The amount should be much less then the OOBN high contribution. |
| SNR_CONTRIB | This is the amount of weighting that SNR metrics is given in the voting comparison. The amount should be much less then OOBN OOBN high contribution. |

The OOBN is weighted for its most useful readings less than a certain level of dB SINAD (e.g. 12 dB SINAD). The heavy weighting in this region is to force the other metrics to be qualified by OOBN. The OOBN above the certain level (e.g. 12) dB SINAD is still used but at to a lesser extent to choose between the available receivers.

The RSSI is masked for the higher bits (around 15-20 dBm) to eliminate temperature and receiver variations. A site at a higher temp may have a 10 dBm lower RSSI, for example, but the RF signal is the same as the lower temp receiver. Also, it may be necessary to tune the receivers RXR to provide a normalized RSSI metric rather than the raw data for RSSI.

The different voting metrics are combined into a single metric to be used for the receiver comparison. Portions of the analog voting algorithm in conventional programming language (C or C+) are as follows:

```
//Variable Definitions
    Oobn_energy_component = OOBN_MAX − oobn_metric
    Oobn_energy_component_ave =
    OOBN_MAX − oobn_metric_ave
    If oobn_energy_component_ave > OOBN_MINSINAD
    {
    Oobn_Total = (oobn_energy_component_ave −
    OOBN_MINISINAD)*
OOBN_LOW_CONTRIB + OOBN_MINSINAD *
OOBN_HIGH_CONTRIB
    }
    Else
    {
            Oobn_Total = oobn_energy_component_ave *
OOBN_HIGH_CONTRIB
    }
    votingTotal = (rssi_ave & RSSI_BUCKET_MASK)*
RSSI_CONTRIB + snr_ave* SNR_CONTRIB + oobn_Total
```

As indicated, the OOBN_HIGH_CONTRIB is the dominant factor in the voting metric. It is based on a averaging of OOBN. But weighted averaged contributions from SNR and RSSI are also used. It has been found that this combination of weighted averaged values promotes identification of the highest quality signals across a variety of conditions.

As can be appreciated, other voting metrics can be used. The designer can select between metrics used in the state of the art, metrics described above, or others.

A switch or promotion to a new stream might be done only if the metrics total (e.g. "votingTotal" described above) from a receiver that is not currently selected is greater than the metrics total from the currently selected receiver by at least some variable amount, and the current receiver's selected time is greater than the minimum voting time.

Optionally, the voting metric algorithm could include a type of "tie-breaker" to distinguish between streams that have the same or closely similar value based on the votingTotal (metrics total) result described above. If multiple receivers have metrics totals which exceed the currently selected receiver by at least the variable amount, then a receiver with metrics on a positive trend will be selected over a receiver with metrics on a negative trend.

Portions of the switching algorithm in conventional programming language are as follows:

```
    Typedef struct
    {
        time    SelectionTime;
        int     votingTotal;
    }RECEIVER;
    RECEIVER BestReceiver, CurrentReceiver;
    BestReceiver = Find greatest receiver. votingTotal;
    if (BestReceiver. votingTotal > CurrentReceiver. votingtotal +
METRICS_HYSTERESSIS && (CurrentTime −
CurrentReceiver.SelectionTime) > MinVotingTime)
    {
        CurrentReceiver = BestReceiver;
        CurrentReceiver.SelectionTime = CurrentTime;
    }
```

This switching algorithm basically "breaks a tie" between metrics totals by looking more favorably at a stream or streams with metrics totals that have been recently improving as opposed to those that have been recently not improving or declining. A positive metrics total trend is assumed to be indicative of a potentially higher quality signal than the opposite.

As can be appreciated by those skilled in the art, alternative algorithms or rules can be used in triggering or implementing the voting metrics. Also, the skilled artisan can use empirical testing to determine the precise weighting of the different individual metrics. This can be dependent on a number of factors.

It is to be noted that voter 10 can also receive and vote on digital packets (see FIG. 4, ref. nos. 70 and 72). Those signals also can contain signal quality information that can be used by the stream selection process (90) to distinguish between those signals by methods known in the art.

e) RXOUT Task

An RXOUT Task opens a send socket and sends out a "keep-alive" (null-payload) packet once per second when the voter is IDLE (FIG. 4, ref. no. 40), or transmits audio packets as they are received from the Stream Selection task (90). This task looks for information (e.g. a "last packet" flag) which signals the end of a call. At the end of a call, the RXOUT Task resets some of the state parameters so other calls can be allowed to go through and it frees up other things, e.g. the active call list, associated with the call that ended.

The audible content of the selected stream is made available for use by the radio system.

6. Error Correction and Detection

Sometimes the voice call information from the subscriber mobile radio 20 is sent with various error correction and detection methods. Examples are BCH coding, Golay coding, Reed Solomon coding, Hamming coding and shortened Cyclic coding. By passing the number of errors the receiver detected to voter 10, voter 10 will be able to select error free components of various receivers' decoded streams.

7. Summary of Specific Example

The comparative voter 10 is able to extend the effective range of mobile communication devices because it is able to select the individual strongest signal from the set of homogenous streams in the case of analog stream, and because it can analyze stream quality. This optimization allows for mobile radios to communicate more effectively at the edge of their operational range as well as in adverse signal propagation conditions.

The voter is able to reduce the cost of radio systems that handle signals requiring digital signal processing, i.e. undecoded analog packets, as it is able to make more effective use of digital signal processors in order to increase the amount of signals a set of digital signal processors can decode. This particular embodiment can decode sixteen streams on a single frequency with only four DSPs. As similar systems use sixteen DSPs to decode sixteen signals, this represents a 400% reduction in the number of required DSPs. Given that DSPs can represent a significant portion of the cost of a voter, this is a significant reduction in costs.

The voter is also better able to distinguish effective signal quality through its use of combined and weighted metrics. Utilizing single signal quality metrics, or not properly interpreting these metrics areas of strength and weakness, can cause systems to misidentify the signals that will yield the best transmission. This method of combining multiple metrics, while emphasizing their areas of strength and masking their areas of weakness, provides for a more accurate method for identifying signal quality.

It is recognized that voter 10 of this example may produce results in certain circumstances that are not optimal. Some examples are as follows.

Voter 10 may not be able to detect if multiple analog streams, received at the same time with the same CTCSS tone (or lack thereof), are the result of multiple receivers decoding an RF stream from a single radio, or multiple streams originating from different radios. The voter would see them as a single call and could potentially select packets from multiple streams, thus producing a corrupt voted stream. However, there should not be multiple radius with the same tone.

Voter 10 may also not know if the call connection fails in the channel controller so it could continue to select a stream that does not result in a valid call. However, this generally only occurs if there is a configuration problem.

Voter 10 may not know if the selected stream has been preempted or ruthlessly preempted by a call in the Channel Controller 30. However, it is beneficial to have the voter to continue to select this stream because in the event the pre-empting call ends this call will be unblocked.

Voter 10 may not know if Channel Controller 30 has dropped the call that the selected stream is participating in. Reasons that the call may have ended include call time limit, or the local channel was a slave participant and the master channel ended the call.

Voter 10 may not know if the priority of the call has been bumped up. The priority of a session-based call could be bumped up if an emergency stream is received and the voter would not have visibility to this. The problem is that voter 10 could allow another stream to ruthlessly preempt a subscriber participating in the emergency call. However, this normally would only occur if the subscriber participating in the emergency call is not the caller generating the emergency stream. The caller generating an emergency stream will always have priority.

However, with a priori knowledge of these issues, the designer can take steps to minimize or compensate for these matters.

D. Options/Alternatives

The foregoing examples and exemplary embodiments are presented by way of illustrative of some forms the invention can take. The invention is not intended to be limited by these examples. The scope and spirit of the invention are defined solely by the appended claims. Variations obvious to those skilled in the art will be included in the invention.

For example, there are a number of ways in which conventional analog subscriber calls are made in an LMR system, and a number of formats or protocols for those calls. The concepts of the exemplary embodiments can be applied in analogous ways to different types of systems and call formats.

Similarly, the ability to direct incoming analog streams to one or more specific DSPs or DSP processes is well known in the state of the art. Conventional systems assign streams to individual full decode DSPs. Therefore, with respect to the present invention, one skilled in the art is equipped with a number of ways to program and design how incoming homogeneous signals can be directed to and processed in one or different DSPs.

Still further, one configuration of a system according to the present invention utilizes four DSP modules to decode up to 58 audio streams, or more. For 58 streams, the ratio of DSPs to streams is over 1:14. However, one skilled in the art could use the concepts of the present invention to configure a similar system for more or less DSP modules depending on the number of audio streams that must be supported and other practical factors. As indicated with respect to the embodiment of FIG. 2, at least a single DSP module must be configured with one full decode DSP process. However, it is believed that more seamless switching from one receiver to another receiver is more likely using either a second full decode DSP process for another high quality stream, or a second DSP module either with or dedicated to a full decode DSP process for another high quality audio stream (FIG. 3). Variations can be made on the configuration of FIG. 3. For example, more than two full decode DSP processes or DSPs might be used, but numbering less than the total number of potential streams to be processed. Similarly, as indicated above, more than two burst decode DSP processes or dedicated DSPs might be used. The skilled in the art designer can select the number of processes and number, configuration, and type of DSP according to need or desire, with consideration of the number and type of streams to process and each DSP's processing power.

Although the specific exemplary embodiments focus on processing of conventional analog audio, the specific example is a mixed mode (analog or digital) configuration. This allows the voter to handle both conventional analog and digital communications. However, it could be used in a solely conventional analog configuration.

The communication protocol(s) and analog audio (voice) encoding are not limited to the examples given. For example, Mu-Law and LPCM are only a few examples of analog codes that can be used. Other analog codes or compressed or uncompressed encoding are possible.

The invention is directed towards reducing DSP processing requirements. As indicated by the examples above, this can be realized by a reduction in the number of real time and/or full decode DSP processes needed to handle a given number of potential incoming streams that require DSP processing. As indicated in the examples, this can be done by reducing the number of streams that are real time and/or fully decoded; and by batch or burst decoding others. Regardless of number of DSPs, this can reduce DSP processing requirements by avoiding real time and/or full decode of each incoming stream.

As further illustrated in the above-described examples, the invention can result in a reduction in the number of DSP modules or chips required. In one case, it could result in handling a plurality of incoming streams in a single DSP, which can represent a very significant reduction. Note that use of even two, three, or four DSPs can likewise be a significant reduction in DSPs when adapted to handle a greater number of incoming streams.

Note that it is possible that a DSP can be programmed or configured to perform a full decode DSP process on a given incoming stream, but convert to a burst decode DSP process for another incoming stream, and vice versa. DSPs, by nature, tend to be highly programmable and customizable.

The invention claimed is:

1. A method of digital signal processing a plurality of incoming audio streams related to a same communication comprising:

a. ranking the plurality of incoming audio streams related to said same communication based on a ranking parameter;
b. digital signal processing at least a part of a higher ranked audio stream related to said same communication in real time; and
c. digital signal processing at least parts of one or more lower ranked audio streams related to said same communication in other than real time.

2. The method of claim 1 wherein the communication is a call from a mobile or portable radio and the plurality of incoming audio streams are homogeneous streams related to the call.

3. The method of claim 1 wherein the incoming audio streams are from a corresponding plurality of receivers.

4. The method of claim 3 wherein the plurality of receivers are space diverse.

5. The method of claim 1 wherein the ranking comprises diversity combining and the ranking parameter comprises a voting metric.

6. The method of claim 5 wherein the voting metric is based at least in part on signal quality.

7. The method of claim 6 wherein the voting metric comprises one or more of out-of-band-noise, signal-to-noise ratio, and received signal strength.

8. The method of claim 1 wherein the ranking parameter comprises at least one of priority designation and voting metric based on signal quality.

9. The method of claim 1 wherein the one or more lower ranked streams comprise a plurality of lower ranked streams.

10. The method of claim 1 wherein the digital signal processing in other than real time comprises burst decoding.

11. The method of claim 1 wherein the incoming audio streams comprise at least portions that are encoded in packets, wherein the packets have associated signaling information related to identity of the stream and signal quality of the stream.

12. The method of claim 11 wherein the real time digital signal processing fully decodes the incoming stream.

13. The method of claim 11 wherein the other than real time digital signal processing decodes only a portion of the incoming stream.

14. The method of claim 13 wherein the portion of the incoming audio stream comprises signaling information.

15. The method of claim 1 further comprising digital signal processing at least a part of a second higher ranked incoming audio stream in real time.

16. The method of claim 15 further comprising selecting for output one of the higher ranked incoming audio streams.

17. The method of claim 1 further comprising ranking the incoming audio streams a plurality of times during a call.

18. The method of claim 17 further comprising reassigning to real time digital signal processing a previously said lower ranked audio stream that becomes said higher ranked audio stream.

19. The method of claim 18 further comprising reassigning to other than real time digital signal processing a previously said higher ranked audio stream that becomes said lower ranked audio stream.

20. The method of claim 1 wherein the real time digital signal processing for each said higher ranked audio stream occurs in a digital signal processor dedicated to that audio stream.

21. The method of claim 20 wherein the other than real time digital signal processing for more than one said lower ranked audio stream occurs in a digital signal processor dedicated to a plurality of said lower ranked audio streams.

22. The method of claim 21 wherein the number of audio streams digitally signal processed for a call exceeds the number of digital signal processors used.

23. A voting apparatus for processing homogeneous encoded analog audio streams from a plurality of receivers in a land mobile radio system during a call from a mobile or portable radio comprising:

a. a first digital signal processor (DSP) process adapted for real time decoding of at least a part of a single audio stream;

b. a second DSP process adapted for batch or burst decoding of at least parts of plural audio streams;

c. a diversity comparison device programmed with a voting metric and adapted to assign the encoded analog audio streams between the real time and the batch or burst decoding.

24. The apparatus of claim 23 wherein the DSP process adapted for real time decoding and the DSP process adapted for batch or burst decoding are configured in a single DSP.

25. The apparatus of claim 23 wherein the voting metric ranks streams based on one or more of priority and signal quality.

26. The apparatus of claim 23 wherein the voting metric ranks streams based on signal quality.

27. The apparatus of claim 26 wherein the voting metric is based on one or more of out-of-band-noise, signal-to-noise-ratio, and received signal strength indicator.

28. The apparatus of claim 27 wherein the voting metric is based on out-of-band-noise, signal-to-noise-ratio, and received signal strength indicator.

29. The apparatus of claim 27 wherein the voting metric is based on a combination of weighted averages of out-of-band-noise, signal-to-noise-ratio, and received signal strength indicator.

30. The apparatus of claim 23 wherein the DSP process adapted for real time decoding and the DSP process adapted for burst decoding are in different DSPs.

31. A method of processing encoded audio streams from a plurality of receivers in a land mobile radio system during a call from a mobile or portable radio comprising;

a. selecting a first said encoded audio stream based on a voting parameter or metric;

b. fully decoding the first encoded audio stream in essentially real time; and c. burst decoding a plurality of other said encoded audio streams in other than real time and in other than full decode.

32. The method of claim 31 wherein the voting parameter or metric comprises one or more of: signal priority; signal quality; audio quality; out-of-band-noise; signal-to-noise ratio; received signal strength indicator.

33. The method of claim 31 further comprising selecting a second audio stream based on a voting parameter or metric and fully decoding the second audio stream in a third DSP in real time.

34. The method of claim 31 further comprising monitoring the quality or priority of all signals based on the voting parameter or metric.

35. The method of claim 31 further comprising promoting an audio stream from other than the selected stream to the selected stream if indicated by the voting parameter or metric.

36. The method of claim 35 further comprising demoting an audio stream from the selected stream to other than a selected stream based on the voting parameter or metric.

37. The method of claim 36 wherein the demoting is based on a comparison of the voting parameter or metric of the demoted audio stream to the voting parameter or metric of another audio stream.

38. The method of claim 31 wherein the decoding in other than real time comprises decoding in batches.

39. The method of claim 38 wherein the decoding in other than real time comprises decoding in bursts.

40. The method of claim 31 wherein the audio signal is analog.

41. The method of claim 40 wherein the analog signal comprises continuous tone-coded squelch system or continuous digital-coded squelch signaling.

42. The method of claim 40 wherein the analog signal is encoded analog audio.

43. The method of claim 40 wherein the encoded analog is Mu-Law or linear pulse-code modulated.

44. The method of claim 31 wherein the audio signal is digital.

45. The method of claim 31 wherein the audio signal is packetized.

46. The method of claim 45 wherein the packetized audio signal comprises information related to the voting parameter.

47. The method of claim 46 wherein the information related to the voting parameter comprises one or more of:

a. signal strength
b. signal to noise ratio
c. signal priority
d. out-of-band noise
e. received signal strength indicator.

48. The method of claim 31 wherein the full decoding is essentially in real time in a first DSP and the decoding in other than real time is in a second DSP.

49. A method of diversity combining of encoded audio streams with fewer digital signal processors (DSPs) than potential encoded audio streams comprising:

a. generating a set of encoded analog audio streams to be voted upon related to a radio call;
b. decoding each audio stream of a first subset of the set of audio streams in a first DSP process;
c. decoding a second subset of a plurality of the set of audio streams in a second DSP process;
d. wherein the first DSP process is real time decoding and the second DSP process is burst decoding.

50. The method of claim 49 wherein the first subset of audio streams comprises a first and second audio streams.

51. The method of claim 49 wherein the second subset of audio streams comprises two or more audio streams.

52. The method of claim 49 wherein the first subset of audio streams comprises a first audio stream.

53. The method of claim 52 wherein the second subset of audio streams comprises at least a second audio stream.

54. The method of claim 52 wherein the second subset of audio streams comprises a plurality of audio streams.

55. The method of claim 54 wherein the plurality of audio streams comprises more than two audio streams.

56. The method of claim 55 wherein the plurality of audio streams comprises more than five audio streams.

57. The method of claim 49 wherein decoding proceeds based on voting between audio streams.

58. The method of claim 57 wherein voting is based on a voting metric indicative of signal quality and/or priority of an audio stream relative to the others.

59. The method of claim 49 wherein the burst decoding is of only a portion of the streams.

* * * * *

UNITED STATES PATENT AND TRADEMARK OFFICE

CERTIFICATE OF CORRECTION

PATENT NO. : 7,944,847 B2
APPLICATION NO. : 11/768011
DATED : May 17, 2011
INVENTOR(S) : Trine et al.

It is certified that error appears in the above-identified patent and that said Letters Patent is hereby corrected as shown below:

Col. 30, Claim 50, Line 2:
DELETE after the word comprises: “a”

Signed and Sealed this
Nineteenth Day of July, 2011

David J. Kappos
*Director of the United States Patent and Trademark Office*